US012774954B2

(12) United States Patent
Ahn et al.

(10) Patent No.: US 12,774,954 B2
(45) Date of Patent: Oct. 27, 2026

(54) DEVICE AND METHOD FOR MEASURING REFRACTION COEFFICIENT AND EXTINCTION COEFFICIENT OF EUV MASK MATERIAL

(71) Applicant: IUCF-HYU (INDUSTRY-UNIVERSITY COOPERATION FOUNDATION HANYANG UNIVERSITY), Seoul (KR)

(72) Inventors: Jinho Ahn, Seoul (KR); Dong Gi Lee, Seoul (KR); Young Woong Kim, Seoul (KR); Seungchan Moon, Seoul (KR); Jin Hyuk Choi, Seoul (KR)

(73) Assignee: IUCF-HYU(INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 131 days.

(21) Appl. No.: 18/870,489

(22) PCT Filed: May 25, 2023

(86) PCT No.: PCT/KR2023/007157

§ 371 (c)(1),
(2) Date: Nov. 29, 2024

(87) PCT Pub. No.: WO2023/234636

PCT Pub. Date: Dec. 7, 2023

(65) Prior Publication Data

US 2025/0321186 A1 Oct. 16, 2025

(30) Foreign Application Priority Data

May 30, 2022 (KR) ........................ 10-2022-0066154

(51) Int. Cl.
*G01N 21/41* (2006.01)
*G01N 21/33* (2006.01)
*G01N 21/45* (2006.01)

(52) U.S. Cl.
CPC ......... *G01N 21/4133* (2013.01); *G01N 21/33* (2013.01); *G01N 21/45* (2013.01); *G01N 2021/4153* (2013.01)

(58) Field of Classification Search
CPC .... G01N 21/4133; G01N 21/33; G01N 21/45; G01N 2021/4153; G01N 21/956;
(Continued)

(56) References Cited

U.S. PATENT DOCUMENTS

2005/0275849 A1* 12/2005 Freimann ........... G01B 9/02039 356/521
2013/0161543 A1 6/2013 Park et al.

FOREIGN PATENT DOCUMENTS

KR 10-2006-0046318 A 5/2006
KR 10-2008-0015768 A 2/2008
(Continued)

OTHER PUBLICATIONS

Li et al., "Interferometry Based EUV Spectrometer", IEEE Photonic Journal, vol. 9, No. 4, 9 pages. (Year: 2017).*
(Continued)

*Primary Examiner* — Kiho Kim
(74) *Attorney, Agent, or Firm* — Sughrue Mion, PLLC

(57) ABSTRACT

Provided is a device for measuring a refraction coefficient and an extinction coefficient. The device for measuring a refraction coefficient and an extinction coefficient may comprise: a light source for generating EUV light; a target for transmitting and reflecting the EUV light generated from the light source; a reflector disposed under the target to reflect the EUV light having been transmitted through the target;
(Continued)

and a detector for detecting an interference pattern by collecting the EUV light having re-transmitted through the target after being reflected from the reflector and the EUV light reflected from the target, wherein a refraction coefficient and an extinction coefficient of the target may be detected by comparing a first interference pattern detected through the target and having a first thickness with a second interference pattern detected through the target and having a second thickness.

14 Claims, 15 Drawing Sheets

(58) Field of Classification Search
CPC ............ G01N 2021/4173; G01N 2021/95676; G01M 11/0228
See application file for complete search history.

(56) References Cited

FOREIGN PATENT DOCUMENTS

| | | | |
|---|---|---|---|
| KR | 10-2010-0111126 | A | 10/2010 |
| KR | 10-2017-0110759 | A | 10/2017 |
| KR | 10-2021-0117622 | A | 9/2021 |
| KR | 10-2320292 | B1 | 11/2021 |
| KR | 10-2375006 | B1 | 3/2022 |
| KR | 10-2022-0043339 | A | 4/2022 |

OTHER PUBLICATIONS

Deuk Gyu Kim, "Optical properties of EUV mask for enhanced imaging performance," Department of Nanoscale Semiconductor Engineering, Hanyang University, Feb. 2022, 45 pages.
International Search Report for International Application No. PCT/KR2023/007157 dated Aug. 30, 2023.

* cited by examiner

【Fig. 1】
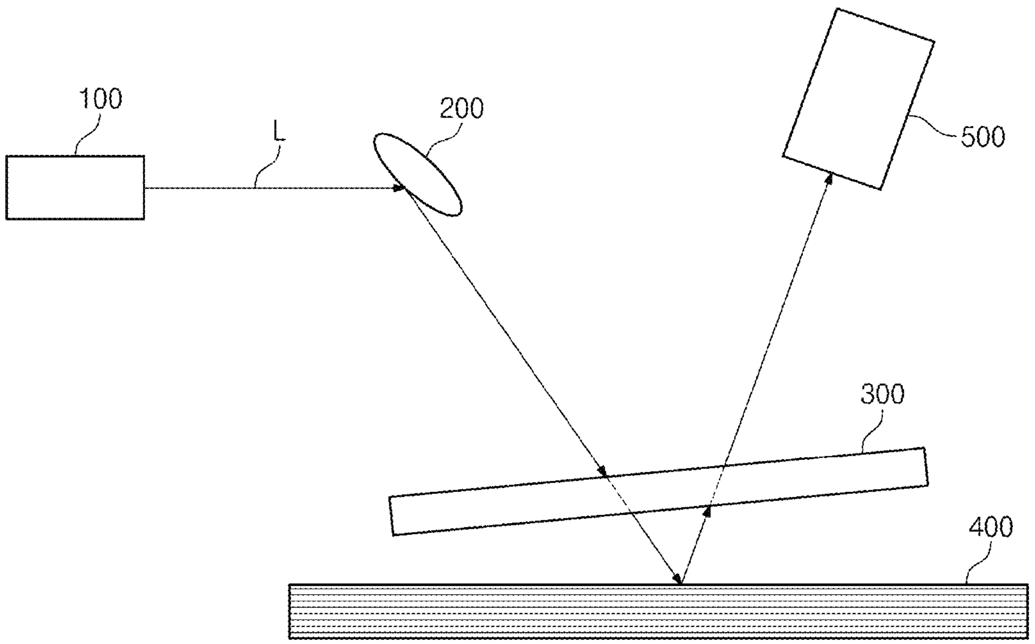

【Fig. 2】
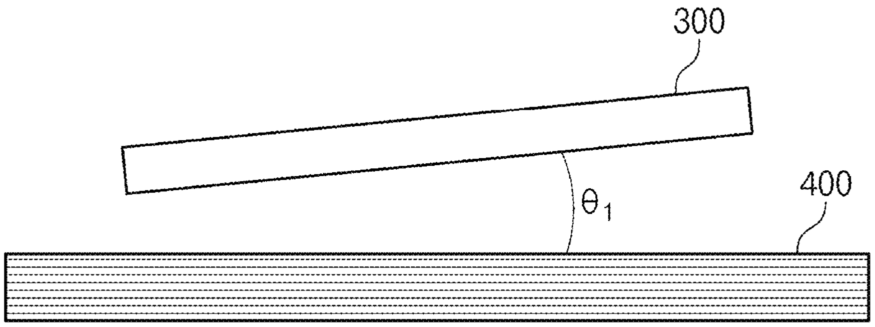

【Fig. 3】
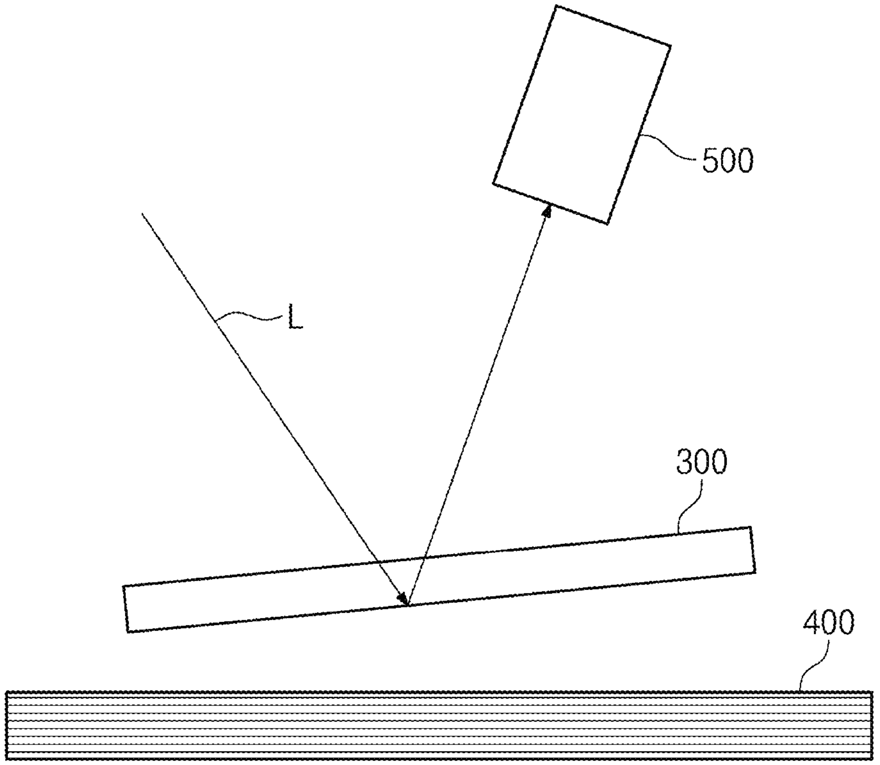

【Fig. 4】
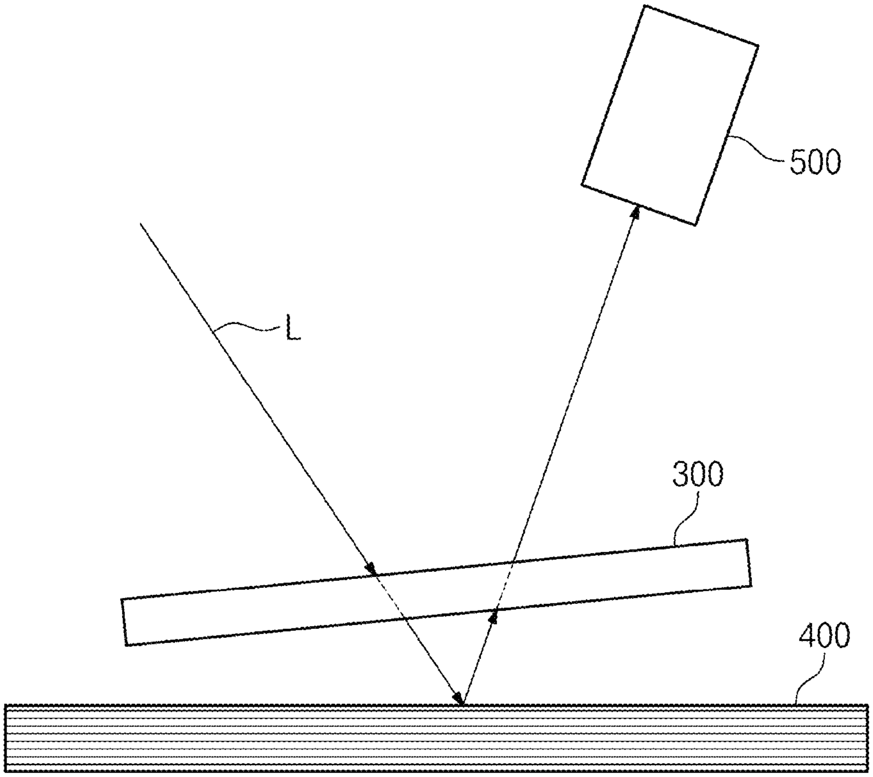

【Fig. 5】
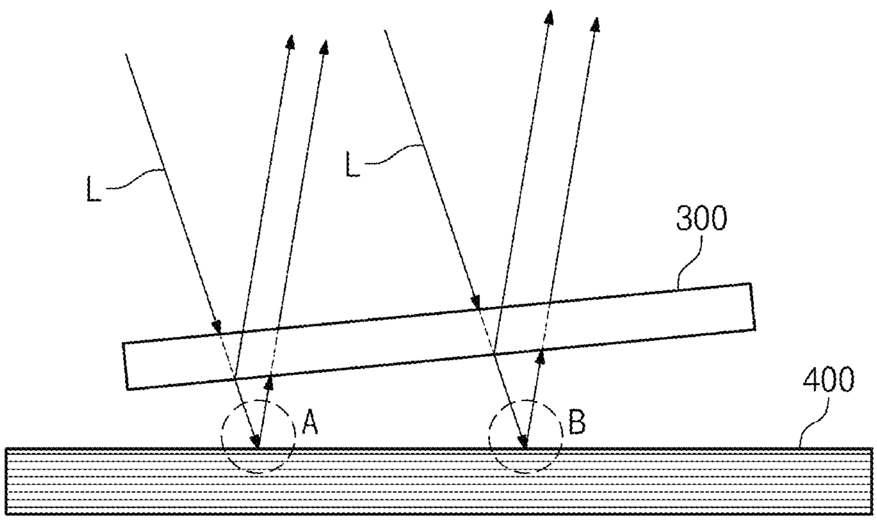

【Fig. 6】
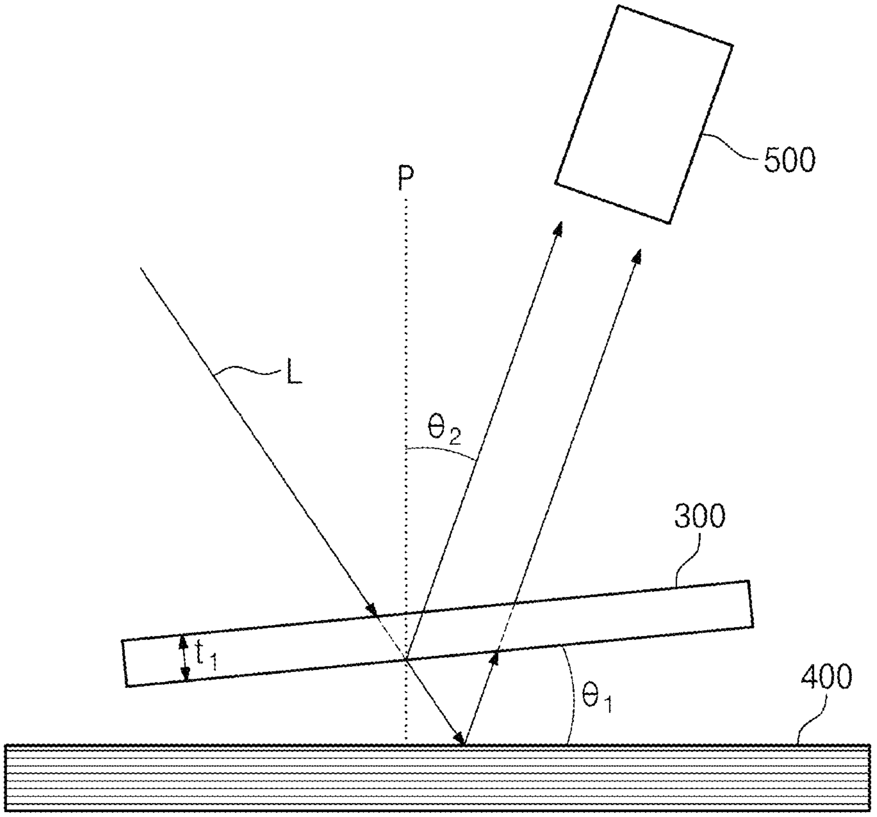

【Fig. 7】
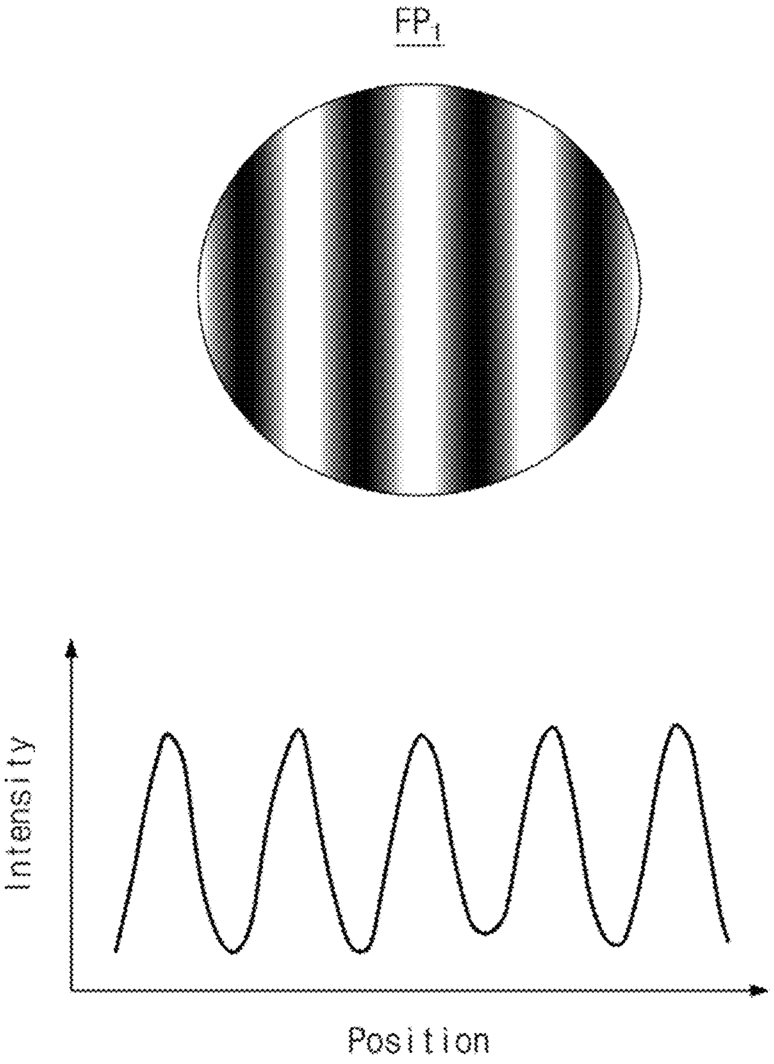

【Fig. 8】
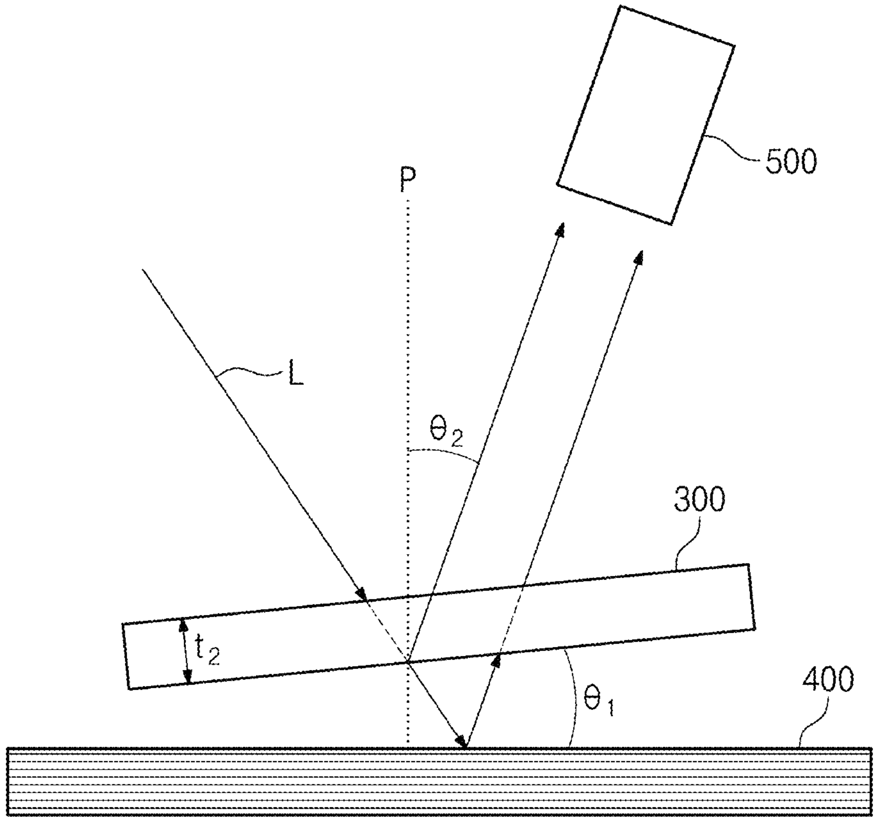

【Fig. 9】
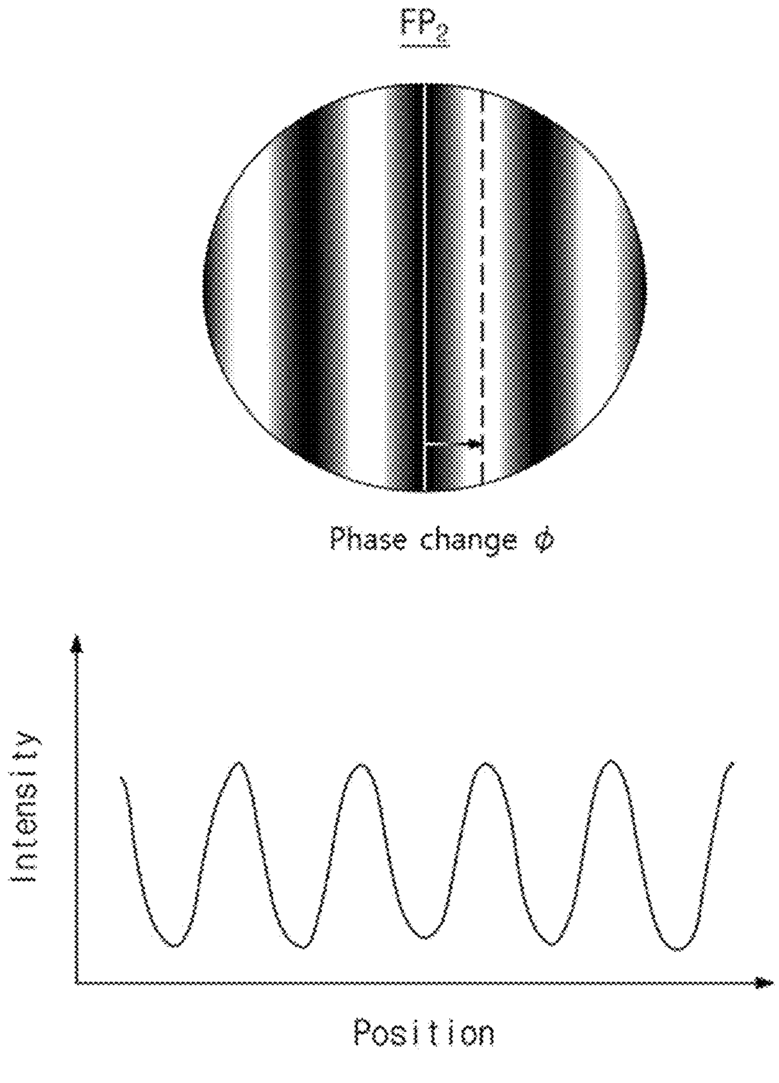

【Fig. 10】
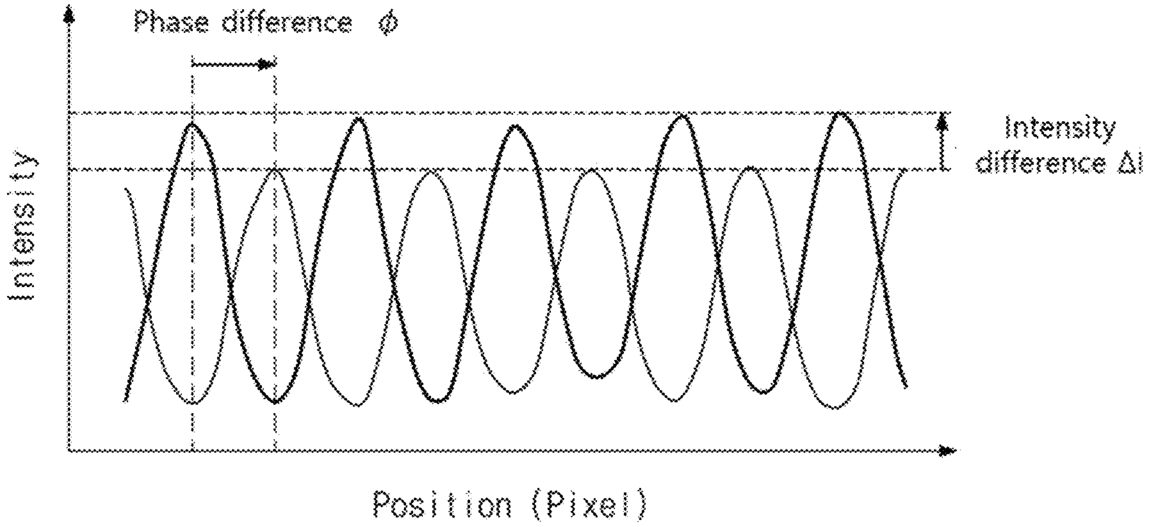

【Fig. 11】
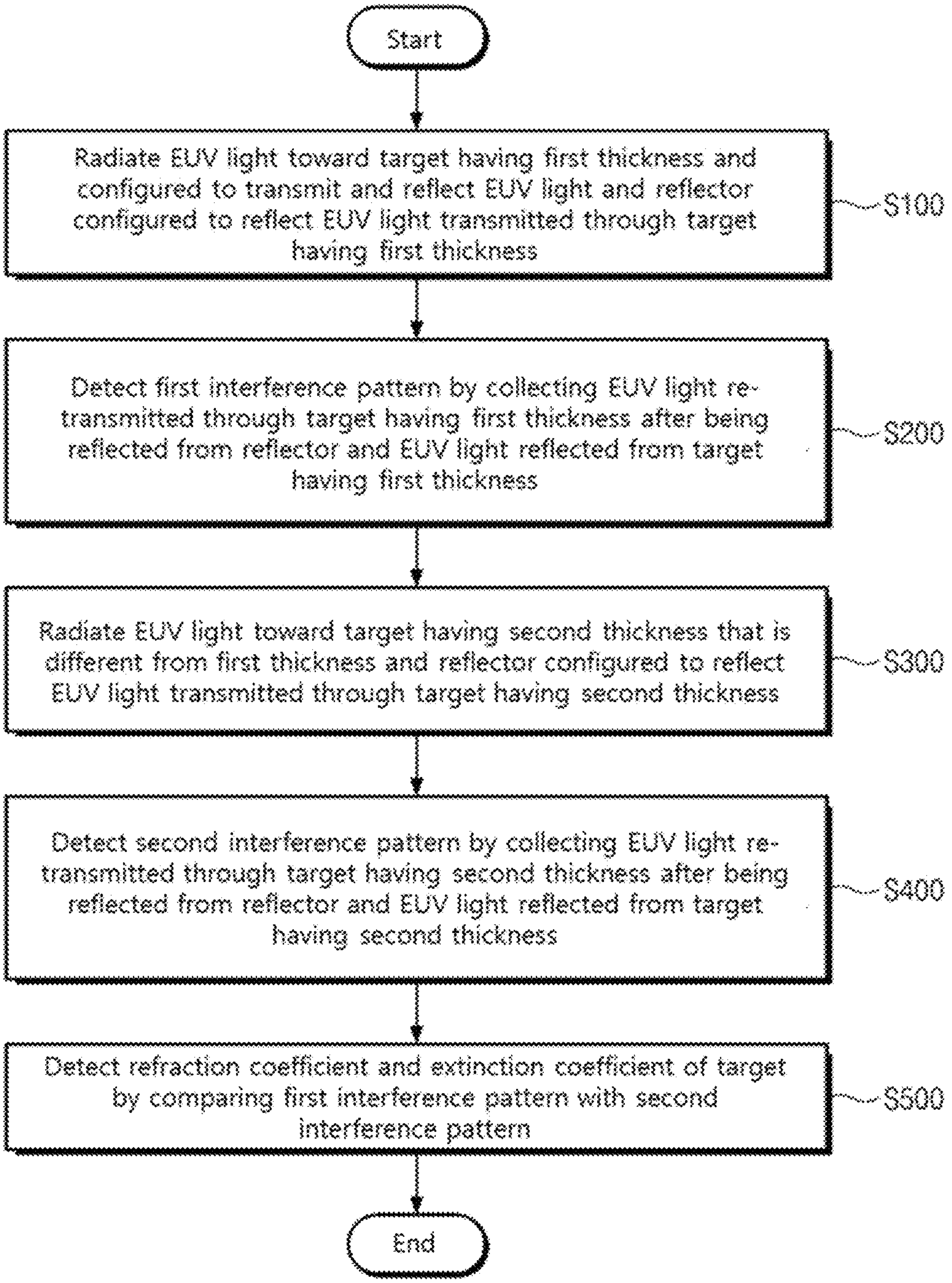

【Fig. 12】
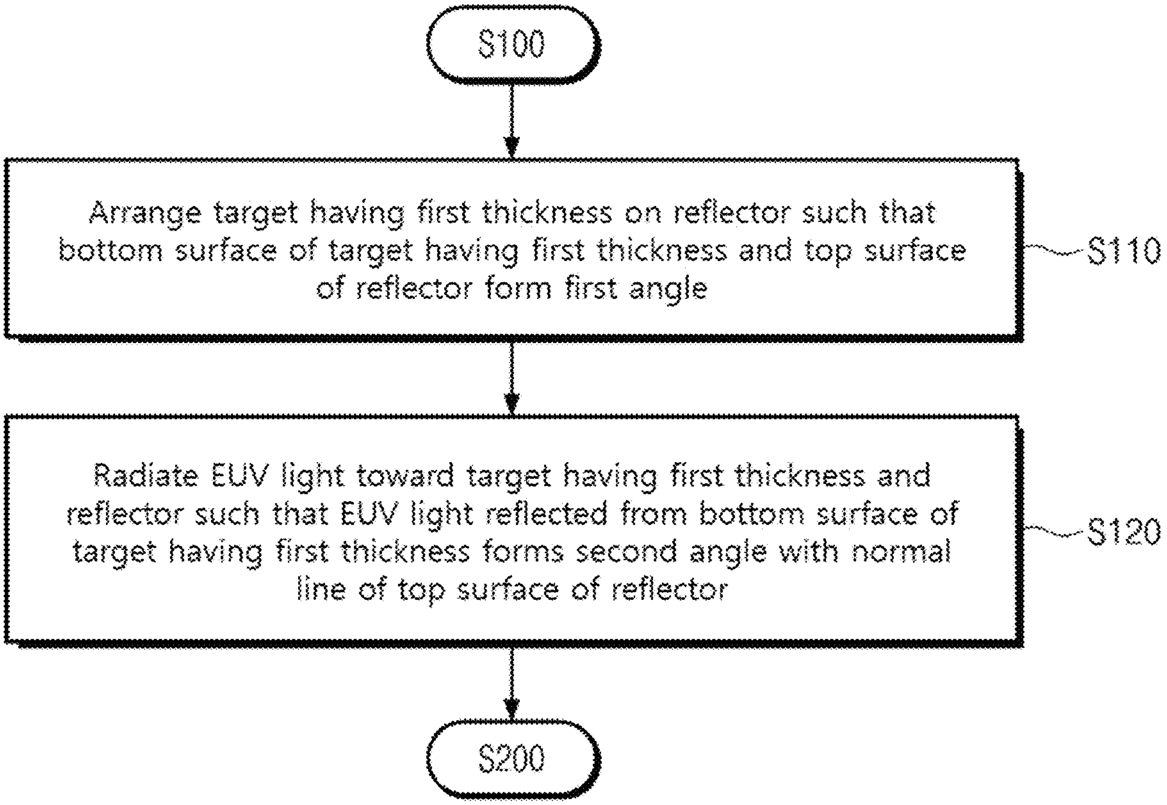

【Fig. 13】
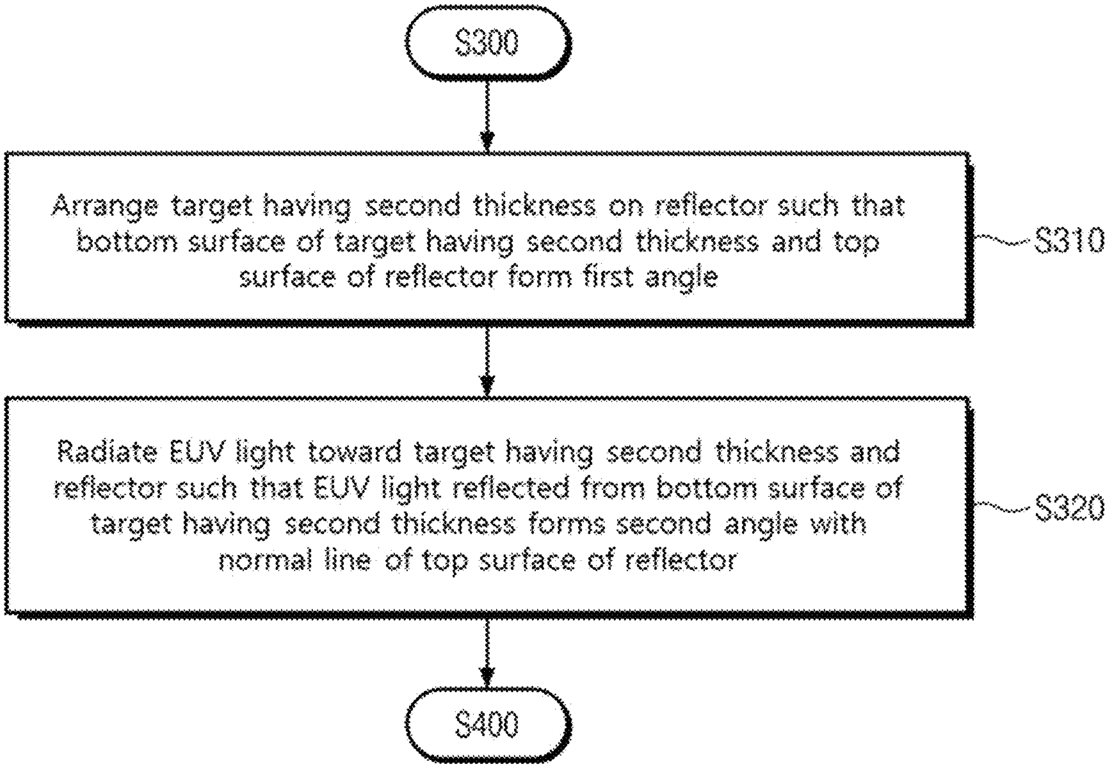

【Fig. 14】
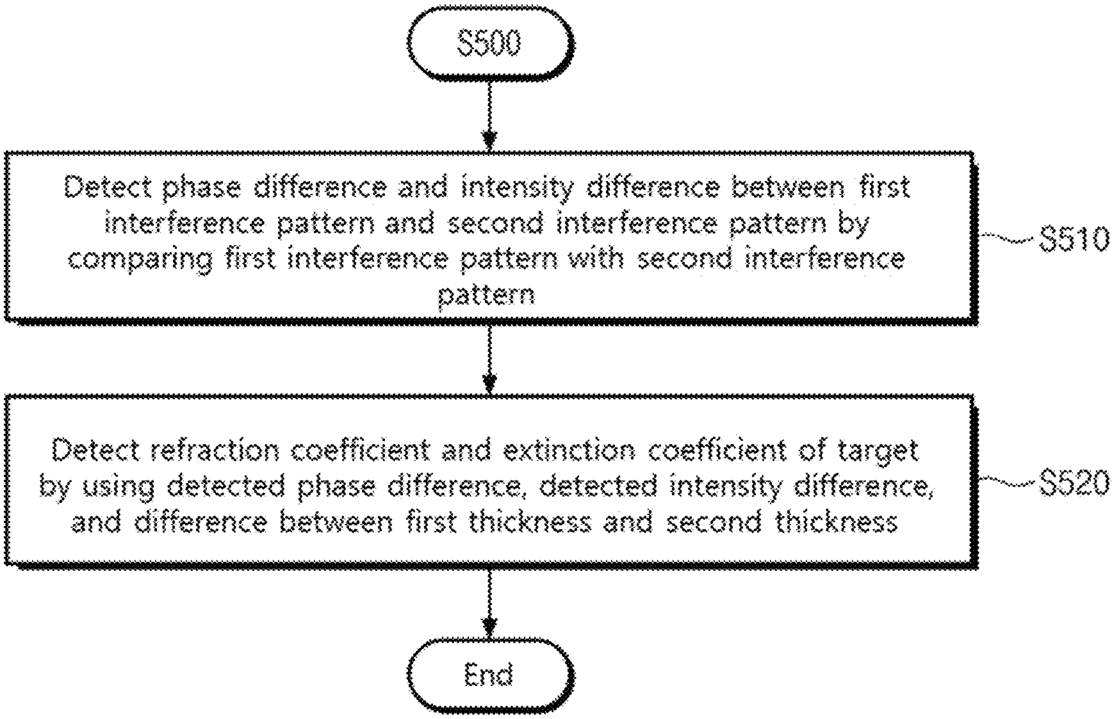

【Fig. 15】
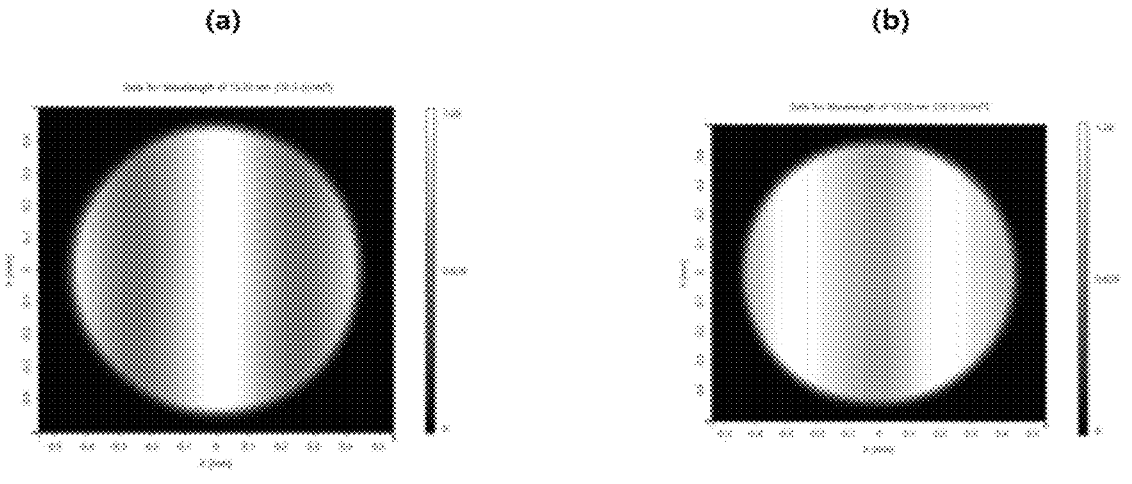

DEVICE AND METHOD FOR MEASURING REFRACTION COEFFICIENT AND EXTINCTION COEFFICIENT OF EUV MASK MATERIAL

CROSS-REFERENCE TO RELATED APPLICATIONS

This is a National Stage of International Application No. PCT/KR2023/007157 filed May 25, 2023, claiming priority based on Korean Patent Application No. 10-2022-0066154 filed May 30, 2022.

TECHNICAL FIELD

The present invention relates to a device and a method for measuring a refraction coefficient and an extinction coefficient of a material that is applicable to a mask used in an EUV process.

BACKGROUND ART

An EUV exposure process for manufacturing a finer semiconductor has been introduced into a mass production process, and a circuit pattern of a mask has been transferred to a wafer through a reflective optical system, a mask, and oblique incident EUV light due to characteristics of an EUV wavelength that is easily absorbed by all materials. The mask is formed of a material that reflects and absorbs EUV light having a wavelength of 13.5 nm, and problems such as a contrast reduction, a line width change, and a circuit pattern movement may occur in an image transferred by the mask due to a mask absorber material that is thick as compared with the EUV wavelength.

In order to transfer a smaller circuit pattern by using the EUV exposure process, research on a phase shift mask (PSM) to reduce a thickness of the absorber material by allowing a refraction coefficient and an extinction coefficient of the mask absorber material to be different from each other and to increase imaging performance and resolution through phase inversion and intensity adjustment of the EUV light transmitted through and reflected from the absorber material has been actively conducted.

The PSM is configured such that light diffracted from the mask may form a fine pattern through interference of reflection light having a phase that is inverted from a mask absorber, and a thickness of the mask absorber may be reduced to alleviate a shadow effect that obstructs propagation of the oblique incident EUV light, so that mask imaging performance may be improved.

Although measurement of the refraction coefficient and the extinction coefficient is essential in order to establish process conditions of a mask material of the PSM, there is no technology for measuring a refraction coefficient and an extinction coefficient of an EUV mask material at an EUV wavelength. The most relevant conventional technology is a technology for detecting a phase difference between two different materials. In more detail, EUV light has to be radiated to two locations by using a double slit, which utilizes a diffraction phenomenon of light using a double slit. Amounts of the EUV light radiated to respective slits of the double slit have to be identical to each other. To this end, a technology for controlling distribution and an amount of EUV light to be radiated and a process for verifying the technology are required. In addition, the EUV light diffracted by the double slit is widely distributed to more than the two locations, and the EUV light reflected from regions other than the two locations may cause errors in an interference pattern formed by diffraction light reflected from the two locations. In order to recognize a nanometer-scale phase inversion effect, measurement errors may be easily caused by the control of the amount of the EUV light and the light reflected from the regions other than the two locations to which the EUV light is radiated. In addition, even when the phase inversion effect of the mask is detected through the conventional technology, a plurality of experiments are required to establish the process conditions of the material, and a phase inversion material has to be deposited and patterned on a multilayer thin film including 40 layers for each experiment.

Therefore, the present invention proposes a device and a method for measuring a refraction coefficient and an extinction coefficient of an EUV mask material so as to improve imaging performance and resolution of a PSM.

DISCLOSURE

Technical Problem

One technical object of the present invention is to provide a device and a method, capable of detecting a refraction coefficient and an extinction coefficient of a target (a mask material used in an EUV process) through a simple scheme.

Another technical object of the present invention is to provide a device and a method, capable of detecting a phase difference and an intensity difference caused by a change in a thickness of a target (a mask material used in an EUV process) without a mathematical operation.

Still another technical object of the present invention is to provide a device and a method, capable of improving imaging performance and resolution of a phase shift mask (PSM).

Technical objects of the present invention are not limited to the technical objects described above.

Technical Solution

To achieve the technical objects described above, the present invention provides a device for measuring a refraction coefficient and an extinction coefficient.

According to one embodiment, the device for measuring the refraction coefficient and the extinction coefficient includes: a light source for generating EUV light; a target for transmitting and reflecting the EUV light generated from the light source; a reflector disposed under the target to reflect the EUV light transmitted through the target; and a detector for detecting an interference pattern by collecting the EUV light re-transmitted through the target after being reflected from the reflector and the EUV light reflected from the target, wherein the refraction coefficient and the extinction coefficient of the target are detected by comparing a first interference pattern detected through the target having a first thickness with a second interference pattern detected through the target having a second thickness.

According to one embodiment, according to the device for measuring the refraction coefficient and the extinction coefficient, a phase difference and an intensity difference between the first interference pattern and the second interference pattern may be detected by comparing the first interference pattern with the second interference pattern, and the refraction coefficient and the extinction coefficient of the target may be detected by using the detected phase difference, the detected intensity difference, and a difference between the first thickness and the second thickness.

According to one embodiment, the target and the reflector may be arranged so as not to be parallel to each other, and, due to the arrangement of the target and the reflector, destructive interference and constructive interference of the EUV light reflected from the target and the EUV light re-transmitted through the target after being reflected from the reflector may be repeatedly exhibited, so that the first interference pattern and the second interference pattern may be detected.

According to one embodiment, the target and the reflector may be arranged such that a bottom surface of the target and a top surface of the reflector form a first angle, and the refraction coefficient and the extinction coefficient of the target may be detected by using the detected phase difference, the detected intensity difference, the difference between the first thickness and the second thickness, and the first angle.

According to one embodiment, the EUV light may be collected by the detector after being reflected from the bottom surface of the target, the EUV light reflected from the bottom surface of the target may form a second angle with a normal line of the top surface of the reflector, and the refraction coefficient and the extinction coefficient of the target may be detected by using the detected phase difference, the detected intensity difference, the difference between the first thickness and the second thickness, the first angle, and the second angle.

According to one embodiment, the refraction coefficient of the target may be detected through <Mathematical Formula 1> below:

$$\phi = \left(\frac{2\pi\delta}{\lambda}\right)\alpha' \quad \text{<Mathematical Formula 1>}$$

where $\varphi$ is a phase difference between a first interference pattern and a second interference pattern, $\lambda$ is a wavelength of EUV light, $1-\delta$ is a refraction coefficient of a target, $\alpha'$ is $2\Delta\alpha/\cos(\theta_1+\theta_2)$, $\Delta\alpha$ is a difference between a first thickness and a second thickness, $\theta_1$ is a first angle, and $\theta_2$ is a second angle.

According to one embodiment, the extinction coefficient of the target may be detected through <Mathematical Formula 2> below:

$$\sqrt{\Delta I} = e^{-\left(\frac{2\pi\beta}{\lambda}\right)\alpha'} \quad \text{<Mathematical Formula 2>}$$

where $\Delta I$ is an intensity difference between a first interference pattern and a second interference pattern, $\lambda$ is a wavelength of EUV light, $\beta$ is an extinction coefficient of a target, $\alpha'$ is $2\Delta\alpha/\cos(\theta_1+\theta_2)$, $\Delta\alpha$ is a difference between a first thickness and a second thickness, $\theta_1$ is a first angle, and $\theta_2$ is a second angle.

According to one embodiment, the difference between the first thickness and the second thickness may satisfy <Mathematical Formula 3> below:

$$\Delta\alpha = \frac{n\lambda}{2}\cos(\theta_1+\theta_2) \quad \text{<Mathematical Formula 3>}$$

where $\Delta\alpha$ is a difference between a first thickness and a second thickness, n is an integer, $\lambda$ is a wavelength of EUV light, $\theta_1$ is a first angle, and $\theta_2$ is a second angle.

According to one embodiment, the target may include a material that is applicable to a mask used in an EUV process.

According to one embodiment, the reflector may have a flat top surface.

To achieve the technical objects described above, the present invention provides a method for measuring a refraction coefficient and an extinction coefficient.

According to one embodiment, the method for measuring the refraction coefficient and the extinction coefficient includes: radiating EUV light toward a target having a first thickness and configured to transmit and reflect the EUV light and a reflector configured to reflect the EUV light transmitted through the target having the first thickness; detecting a first interference pattern by collecting the EUV light re-transmitted through the target having the first thickness after being reflected from the reflector and the EUV light reflected from the target having the first thickness; radiating the EUV light toward the target having a second thickness that is different from the first thickness and the reflector configured to reflect the EUV light transmitted through the target having the second thickness; detecting a second interference pattern by collecting the EUV light re-transmitted through the target having the second thickness after being reflected from the reflector and the EUV light reflected from the target having the second thickness; and detecting the refraction coefficient and the extinction coefficient of the target by comparing the first interference pattern with the second interference pattern.

According to one embodiment, the detecting of the refraction coefficient and the extinction coefficient of the target may include: detecting a phase difference and an intensity difference between the first interference pattern and the second interference pattern by comparing the first interference pattern with the second interference pattern; and detecting the refraction coefficient and the extinction coefficient of the target by using the detected phase difference, the detected intensity difference, and a difference between the first thickness and the second thickness.

According to one embodiment, the radiating of the EUV light toward the target having the first thickness and configured to transmit and reflect the EUV light and the reflector configured to reflect the EUV light transmitted through the target having the first thickness may include: arranging the target having the first thickness on the reflector such that a bottom surface of the target having the first thickness and a top surface of the reflector form a first angle; and radiating the EUV light toward the target having the first thickness and the reflector such that the EUV light reflected from the bottom surface of the target having the first thickness forms a second angle with a normal line of the top surface of the reflector, and the radiating of the EUV light toward the target having the second thickness that is different from the first thickness and the reflector configured to reflect the EUV light transmitted through the target having the second thickness may include: arranging the target having the second thickness on the reflector such that a bottom surface of the target having the second thickness and the top surface of the reflector form the first angle; and radiating the EUV light toward the target having the second thickness and the reflector such that the EUV light reflected from the bottom surface of the target having the second thickness forms the second angle with the normal line of the top surface of the reflector.

According to one embodiment, the refraction coefficient of the target may be detected through <Mathematical Formula 1> below, and the extinction coefficient of the target may be detected through <Mathematical Formula 2> below:

$$\phi = \left(\frac{2\pi\delta}{\lambda}\right)\alpha' \qquad \text{<Mathematical Formula 1>}$$

$$\sqrt{\Delta I} = e^{-\left(\frac{2\pi\beta}{\lambda}\right)\alpha'} \qquad \text{<Mathematical Formula 2>}$$

where φ is a phase difference between a first interference pattern and a second interference pattern, ΔI is an intensity difference between a first interference pattern and a second interference pattern, Δ is a wavelength of EUV light, 1-δ is a refraction coefficient of a target, β is an extinction coefficient of a target, α' is $24a/\cos(\theta_1+\theta_2)$, Δα is a difference between a first thickness and a second thickness, $\theta_1$ is a first angle, and $\theta_2$ is a second angle.

Advantageous Effects

According to an embodiment of the present invention, a device for measuring a refraction coefficient and an extinction coefficient may include: a light source for generating EUV light; a target (a mask material used in an EUV process) for transmitting and reflecting the EUV light generated from the light source; a reflector disposed under the target to reflect the EUV light transmitted through the target; and a detector for detecting an interference pattern by collecting the EUV light re-transmitted through the target after being reflected from the reflector and the EUV light reflected from the target, wherein the refraction coefficient and the extinction coefficient of the target are detected by comparing a first interference pattern detected through the target having a first thickness with a second interference pattern detected through the target having a second thickness. Accordingly, the refraction coefficient and the extinction coefficient of the target can be easily detected, so that imaging performance and resolution of a phase shift mask (PSM) can be easily improved.

DESCRIPTION OF DRAWINGS

FIG. 1 is a view for describing a device for measuring a refraction coefficient and an extinction coefficient according to an embodiment of the present invention.

FIG. 2 is a view for describing arrangement of a target and a reflector included in the device for measuring the refraction coefficient and the extinction coefficient according to the embodiment of the present invention.

FIG. 3 and FIG. 4 are views for describing EUV collection through a detector included in the device for measuring the refraction coefficient and the extinction coefficient according to the embodiment of the present invention.

FIG. 5 is a view for describing detection of an interference pattern through the device for measuring the refraction coefficient and the extinction coefficient according to the embodiment of the present invention.

FIG. 6 and FIG. 7 are views for describing a process for detecting a first interference pattern through the device for measuring the refraction coefficient and the extinction coefficient according to the embodiment of the present invention.

FIG. 8 and FIG. 9 are views for describing a process for detecting a second interference pattern through the device for measuring the refraction coefficient and the extinction coefficient according to the embodiment of the present invention.

FIG. 10 is a view for describing detection of a phase difference and an intensity difference through the device for measuring the refraction coefficient and the extinction coefficient according to the embodiment of the present invention.

FIG. 11 is a flowchart for describing a method for measuring a refraction coefficient and an extinction coefficient according to an embodiment of the present invention.

FIG. 12 is a view for specifically describing a step S100 of the method for measuring the refraction coefficient and the extinction coefficient according to the embodiment of the present invention.

FIG. 13 is a view for specifically describing a step S300 of the method for measuring the refraction coefficient and the extinction coefficient according to the embodiment of the present invention.

FIG. 14 is a view for specifically describing a step S500 of the method for measuring the refraction coefficient and the extinction coefficient according to the embodiment of the present invention.

FIG. 15 is a view for describing simulation results of the device for measuring the refraction coefficient and the extinction coefficient according to the embodiment of the present invention.

MODE FOR INVENTION

Hereinafter, exemplary embodiments of the present invention will be described in detail with reference to the accompanying drawings. However, the technical idea of the present invention is not limited to the embodiments described herein, but may be embodied in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and regions are exaggerated for effective description of the technical contents.

In addition, although the terms such as first, second, and third have been used to describe various elements in various embodiments of the present disclosure, the elements are not limited by the terms. The terms are used only to distinguish one element from another element. Therefore, an element mentioned as a first element in one embodiment may be mentioned as a second element in another embodiment. The embodiments described and illustrated herein include their complementary embodiments, respectively. Further, the term "and/or" used in the present disclosure is used to include at least one of the elements enumerated before and after the term.

As used herein, an expression in a singular form includes a meaning of a plural form unless the context clearly indicates otherwise. Further, the terms such as "including" and "having" are intended to designate the presence of features, numbers, steps, elements, or combinations thereof described herein, and shall not be construed to preclude any possibility of the presence or addition of one or more other features, numbers, steps, elements, or combinations thereof. In addition, the term "connection" used herein is used to include both indirect and direct connections of a plurality of elements.

Further, in the following description of the present invention, detailed descriptions of known functions or configurations incorporated herein will be omitted when they may make the gist of the present invention unnecessarily unclear.

FIG. 1 is a view for describing a device for measuring a refraction coefficient and an extinction coefficient according to an embodiment of the present invention, FIG. 2 is a view for describing arrangement of a target and a reflector included in the device for measuring the refraction coefficient and the extinction coefficient according to the embodiment of the present invention, FIG. 3 and FIG. 4 are views for describing EUV collection through a detector included in the device for measuring the refraction coefficient and the extinction coefficient according to the embodiment of the present invention, and FIG. 5 is a view for describing detection of an interference pattern through the device for measuring the refraction coefficient and the extinction coefficient according to the embodiment of the present invention.

Referring to FIG. 1, according to an embodiment of the present invention, a device for measuring a refraction coefficient and an extinction coefficient may include a light source 100, a mirror 200, a target 300, a reflector 400, and a detector 500. Hereinafter, each component will be described.

The light source 100 may generate EUV light L. According to one embodiment, the light source 100 may generate coherent EUV light in a high-order harmonic wave scheme. In more detail, the light source 100 may generate EUV light L having a wavelength of 13.5 nm by radiating an infrared laser, which has a wavelength of 800 nm and an S-polarized femtosecond (fs) pulse width, to a noble gas.

The EUV light L generated from the light source 100 may be provided to the mirror 200. The mirror 200 may reflect the EUV light L to change a path of the EUV light L. The EUV light L having the path that is changed through the mirror 200 may be provided to the target 300.

The target 300 may be disposed on the reflector 400 while being spaced apart from the reflector 400. According to one 300 and the reflector 400 may be embodiment, the target arranged so as not to be parallel to each other. In detail, as shown in FIG. 2, a bottom surface of the target 300 and a top surface of the reflector 400 may form a first angle $\theta_1$. For example, the first angle $\theta_1$ may be an angle that is less than 90°.

In addition, the first angle $\theta_1$ may vary according to a size of the EUV light L. For example, when the size of the EUV light L is increased, a size of the first angle $\theta_1$ may be increased, whereas when the size of the EUV light L is decreased, the size of the first angle $\theta_1$ may be decreased. In addition, unlike the configuration shown in FIG. 2, the target 300 may be arranged in a flat state, and the reflector 400 may be arranged so as to be tilted.

The target 300 may transmit or reflect the EUV light L. According to one embodiment, the target 300 may be a material that is applicable to a mask used in an EUV process. For example, the target 300 may be a material in which a ruthenium (Ru) thin film and a silicon nitride (SiN) thin film are stacked.

The reflector 400 may reflect the EUV light L. According to one embodiment, the target may be a multilayer thin film (Mo/Si) including 40 layers and used in the EUV process. In addition, the top surface of the reflector 400 may be flat.

The EUV light L having the path that is changed through the mirror 200 may be provided to the target 300. The target 300 may reflect or transmit the EUV light L. As shown in FIG. 3, the EUV light L reflected from the target 300 may be provided to the detector 500.

Meanwhile, the EUV light L transmitted through the target 300 may be provided to the reflector 400. The EUV light L provided to the reflector 400 may be reflected by the reflector 400. The EUV light L reflected from the reflector 400 may be re-transmitted through the target 300 after being provided again to the target 300. As shown in FIG. 4, the EUV light L re-transmitted through the target 300 after being reflected from the reflector 400 may be provided to the detector 500.

The detector 500 may detect an interference pattern by collecting the EUV light L re-transmitted through the target 300 after being reflected from the reflector 400 and the EUV light reflected from the target 300.

In detail, as shown in FIG. 5, when the target 300 and the reflector 400 are arranged so as not to be parallel to each other, even though single EUV light is radiated toward the target 300, a difference in an optical path length may occur according to a location (e.g., A or B) of the radiated EUV light (an optical path becomes longer at the location B than at the location A). Accordingly, destructive interference and constructive interference of the EUV light L reflected from the target 300 and the EUV light L re-transmitted through the target 300 after being reflected from the reflector 400 may be repeatedly exhibited, so that the interference pattern may be detected through the detector 500.

According to the embodiment of the present invention, the device for measuring the refraction coefficient and the extinction coefficient may detect the refraction coefficient and the extinction coefficient of the target 300 by comparing a first interference pattern detected from the target 300 having a first thickness with a second interference pattern detected from the target 300 having a second thickness. Hereinafter, the detection of the refraction coefficient and the extinction coefficient of the target 300 will be described in detail.

FIG. 6 and FIG. 7 are views for describing a process for detecting a first interference pattern through the device for measuring the refraction coefficient and the extinction coefficient according to the embodiment of the present invention, FIG. 8 and FIG. 9 are views for describing a process for detecting a second interference pattern through the device for measuring the refraction coefficient and the extinction coefficient according to the embodiment of the present invention, and FIG. 10 is a view for describing detection of a phase difference and an intensity difference through the device for measuring the refraction coefficient and the extinction coefficient according to the embodiment of the present invention.

Referring to FIGS. 6 and 7, a first interference pattern $FP_1$ may be detected by collecting the EUV light L reflected from the target 300 having a first thickness $t_1$ and the EUV light L re-transmitted through the target 300 having the first thickness $t_1$ after being reflected from the reflector 400.

Referring to FIGS. 8 and 9, a second interference pattern $FP_2$ may be detected by collecting the EUV light L reflected from the target 300 having a second thickness $t_2$ and the EUV light L re-transmitted through the target 300 having the second thickness $t_2$ after being reflected from the reflector 400. According to one embodiment, the second thickness $t_2$ may be thicker than the first thickness $t_1$.

Referring to FIG. 10, a phase difference q and an intensity difference ΔI between the first interference pattern $FP_1$ and the second interference pattern $FP_2$ may be detected through comparing the first interference pattern $FP_1$ with the second interference pattern $FP_2$.

The device for measuring the refraction coefficient and the extinction coefficient may detect the refraction coefficient and the extinction coefficient of the target 300 by using the phase difference q, the intensity difference ΔI, a difference between the first thickness $t_1$ and the second thickness $t_2$, the first angle $\theta_1$, and a second angle $\theta_2$. According to one embodiment, the second angle $\theta_2$ may be defined as an angle formed by the EUV light L reflected from the bottom surface of the target 300 and a normal line P of the top surface of the reflector 400 as shown in FIGS. 6 and 8.

In detail, the refraction coefficient of the target 300 may be detected through <Mathematical Expression 1> below. Meanwhile, the extinction coefficient of the target 300 may be detected through <Mathematical Expression 2> below.

$$\phi = \left(\frac{2\pi\delta}{\lambda}\right)\alpha' \qquad \text{<Mathematical Formula 1>}$$

$$\sqrt{\Delta I} = e^{-\left(\frac{2\pi\beta}{\lambda}\right)\alpha'} \qquad \text{<Mathematical Formula 2>}$$

where φ is a phase difference between a first interference pattern and a second interference pattern, ΔI is an intensity difference between a first interference pattern and a second interference pattern, λ is a wavelength of EUV light, 1-δ is a refraction coefficient of a target, β is an extinction coefficient of a target, α' is $2\Delta\alpha/\cos(\theta_1+\theta_2)$, Δα is a difference between a first thickness and a second thickness, $\theta_1$ is a first angle, and $\theta_2$ is a second angle.

In addition, the difference between the first thickness $t_1$ and the second thickness $t_2$ may satisfy <Mathematical Formula 3> below.

$$\Delta\alpha = \frac{n\lambda}{2}\cos(\theta_1+\theta_2) \qquad \text{<Mathematical Formula 3>}$$

where Δα is a difference between a first thickness and a second thickness, n is an integer, λ is a wavelength of EUV light, $\theta_1$ is a first angle, and $\theta_2$ is a second angle.

In other words, the device for measuring the refraction coefficient and the extinction coefficient according to the embodiment of the present invention may easily measure the refraction coefficient and the extinction coefficient of the target 300 through a simple scheme of comparing the interference pattern measured by using the target 300 before the thickness is changed with the interference pattern measured by using the target 300 after the thickness is changed.

Accordingly, the device for measuring the refraction coefficient and the extinction coefficient according to the embodiment of the present invention has been described above. Hereinafter, a method for measuring a refraction coefficient and an extinction coefficient according to an embodiment of the present invention will be described.

FIG. 11 is a flowchart for describing a method for measuring a refraction coefficient and an extinction coefficient according to an embodiment of the present invention, FIG. 12 is a view for specifically describing a step S100 of the method for measuring the refraction coefficient and the extinction coefficient according to the embodiment of the present invention, FIG. 13 is a view for specifically describing a step S300 of the method for measuring the refraction coefficient and the extinction coefficient according to the embodiment of the present invention, and FIG. 14 is a view for specifically describing a step S500 of the method for measuring the refraction coefficient and the extinction coefficient according to the embodiment of the present invention.

Referring to FIGS. 11 to 14, according to the embodiment of the present invention, the method for measuring the refraction coefficient and the extinction coefficient may include: radiating EUV light toward a target having a first thickness and a reflector (S100); detecting a first interference pattern (S200); radiating the EUV light toward the target having a second thickness and the reflector (S300); detecting a second interference pattern (S400); and detecting the refraction coefficient and the extinction coefficient of the target (S500). Each step will be described below.

In the step S100, the EUV light may be radiated toward the target having the first thickness and configured to transmit and reflect the EUV light and the reflector configured to reflect the EUV light transmitted through the target having the first thickness. According to one embodiment, the step S100 may include: arranging the target having the first thickness on the reflector such that a bottom surface of the target having the first thickness and a top surface of the reflector form a first angle (S110); and radiating the EUV light toward the target having the first thickness and the reflector such that the EUV light reflected from the bottom surface of the target having the first thickness forms a second angle with a normal line of the top surface of the reflector (S120).

In the step S200, the EUV light re-transmitted through the target having the first thickness after being reflected from the reflector and the EUV light reflected from the target having the first thickness may be collected. Accordingly, the first interference pattern may be detected.

In the step S300, the EUV light may be radiated toward the target having a second thickness that is different from the first thickness and the reflector configured to reflect the EUV light transmitted through the target having the second thickness. According to one embodiment, the step S300 may include: arranging the target having the second thickness on the reflector such that a bottom surface of the target having the second thickness and the top surface of the reflector form the first angle (S310); and radiating the EUV light toward the target having the second thickness and the reflector such that the EUV light reflected from the bottom surface of the target having the second thickness forms the second angle with the normal line of the top surface of the reflector (S320).

In the step S400, the EUV light re-transmitted through the target having the second thickness after being reflected from the reflector and the EUV light reflected from the target having the second thickness may be collected. Accordingly, the second interference pattern may be detected.

In the step S500, the refraction coefficient and the extinction coefficient of the target may be detected by comparing the first interference pattern with the second interference pattern. According to one embodiment, the step S500 may include: detecting a phase difference and an intensity difference between the first interference pattern and the second interference pattern by comparing the first interference pattern with the second interference pattern (S510); and detecting the refraction coefficient and the extinction coefficient of the target by using the detected phase difference, the detected intensity difference, and a difference between the first thickness and the second thickness (S520). In more detail, the refraction coefficient of the target may be detected through <Mathematical Formula 1> described above, and the extinction coefficient of the target may be detected through <Mathematical Formula 2> described above.

Accordingly, the method for measuring the refraction coefficient and the extinction coefficient according to the embodiment of the present invention has been described above. Hereinafter, simulation results of the device for measuring the refraction coefficient and the extinction coefficient according to the embodiment of the present invention will be described.

FIG. 15 is a view for describing simulation results of the device for measuring the refraction coefficient and the extinction coefficient according to the embodiment of the present invention.

Referring to FIG. 15, a simulation was performed on the device for measuring the refraction coefficient and the extinction coefficient according to the embodiment described with reference to FIGS. 1 to 10. In detail, a structure in which a silicon nitride (SiN) thin film is stacked on a ruthenium (Ru) thin film was used as a target, and a Mo/Si multilayer thin film having a reflectivity of 40 to 68% was used as a reflector.

In FIG. 15, (a) of FIG. 15 shows a first interference pattern detected with a target in which a silicon nitride (SiN) thin film having a thickness of 50 nm is stacked on a ruthenium (Ru) thin film having a thickness of 70 nm, and (b) of FIG. 15 shows a second interference pattern detected with a target in which a silicon nitride (SiN) thin film having a thickness of 50 nm is stacked on a ruthenium (Ru) thin film having a thickness of 11 nm.

As found through (a) and (b) of FIG. 15, a phase difference occurred between the first interference pattern and the second interference pattern as the thickness of the target is changed.

Although the exemplary embodiments of the present invention have been described in detail above, the scope of the present invention is not limited to a specific embodiment, and shall be interpreted by the appended claims. In addition, it is to be understood by a person having ordinary skill in the art that various changes and modifications can be made without departing from the scope of the present invention.

INDUSTRIAL APPLICABILITY

The device and the method for measuring the refraction coefficient and the extinction coefficient of the EUV mask material according to the embodiment of the present invention may be applied to the semiconductor industry.

The invention claimed is:

1. A device for measuring a refraction coefficient and an extinction coefficient, the device comprising:

a light source for generating EUV light;

a target for transmitting and reflecting the EUV light generated from the light source;

a reflector disposed under the target to reflect the EUV light transmitted through the target; and a detector for detecting an interference pattern by collecting the EUV light re-transmitted through the target after being reflected from the reflector and the EUV light reflected from the target, wherein the refraction coefficient and the extinction coefficient of the target are detected by comparing a first interference pattern detected through the target having a first thickness with a second interference pattern detected through the target having a second thickness.

2. The device of claim 1, wherein a phase difference and an intensity difference between the first interference pattern and the second interference pattern are detected by comparing the first interference pattern with the second interference pattern, and the refraction coefficient and the extinction coefficient of the target are detected by using the detected phase difference, the detected intensity difference, and a difference between the first thickness and the second thickness.

3. The device of claim 2, wherein the target and the reflector are arranged so as not to be parallel to each other, and, due to the arrangement of the target and the reflector, destructive interference and constructive interference of the EUV light reflected from the target and the EUV light re-transmitted through the target after being reflected from the reflector are repeatedly exhibited, so that the first interference pattern and the second interference pattern are detected.

4. The device of claim 3, wherein the target and the reflector are arranged such that a bottom surface of the target and a top surface of the reflector form a first angle, and the refraction coefficient and the extinction coefficient of the target are detected by using the detected phase difference, the detected intensity difference, the difference between the first thickness and the second thickness, and the first angle.

5. The device of claim 4, wherein the EUV light is collected by the detector after being reflected from the bottom surface of the target, the EUV light reflected from the bottom surface of the target forms a second angle with a normal line of the top surface of the reflector, and the refraction coefficient and the extinction coefficient of the target are detected by using the detected phase difference, the detected intensity difference, the difference between the first thickness and the second thickness, the first angle, and the second angle.

6. The device of claim 5, wherein the refraction coefficient of the target is detected through <Mathematical Formula 1> below:

$$\phi = \left(\frac{2\pi\delta}{\lambda}\right)\alpha' \quad \text{<Mathematical Formula 1>}$$

where $\varphi$ is a phase difference between a first interference pattern and a second interference pattern, $\lambda$ is a wavelength of EUV light, $1-\delta$ is a refraction coefficient of a target, $\alpha'$ is $2\Delta\alpha/\cos(\theta_1+\theta_2)$, $\Delta\alpha$ is a difference between a first thickness and a second thickness, $\theta_1$ is a first angle, and $\theta_2$ is a second angle.

7. The device of claim 5, wherein the extinction coefficient of the target is detected through <Mathematical Formula 2> below:

$$\sqrt{\Delta I} = e^{-\left(\frac{2\pi\beta}{\lambda}\right)\alpha'} \quad \text{<Mathematical Formula 2>}$$

where $\Delta I$ is an intensity difference between a first interference pattern and a second interference pattern, $\lambda$ is a wavelength of EUV light, $\beta$ is an extinction coefficient of a target, $\alpha'$ is $2\Delta\alpha/\cos(\theta_1+\theta_2)$, $\Delta\alpha$ is a difference between a first thickness and a second thickness, $\theta_1$ is a first angle, and $\theta_2$ is a second angle.

8. The device of claim 5, wherein the difference between the first thickness and the second thickness satisfies <Mathematical Formula 3> below:

$$\Delta\alpha = \frac{n\lambda}{2}\cos(\theta_1 + \theta_2) \quad \text{<Mathematical Formula 3>}$$

where $\Delta\alpha$ is a difference between a first thickness and a second thickness, n is an integer, $\lambda$ is a wavelength of EUV light, $\theta_1$ is a first angle, and $\theta_2$ is a second angle.

9. The device of claim 1, wherein the target includes a material that is applicable to a mask used in an EUV process.

10. The device of claim 1, wherein the reflector has a flat top surface.

11. A method for measuring a refraction coefficient and an extinction coefficient, the method comprising:

radiating EUV light toward a target having a first thickness and configured to transmit and reflect the EUV light and a reflector configured to reflect the EUV light transmitted through the target having the first thickness;

detecting a first interference pattern by collecting the EUV light re-transmitted through the target having the first thickness after being reflected from the reflector and the EUV light reflected from the target having the first thickness;

radiating the EUV light toward the target having a second thickness that is different from the first thickness and the reflector configured to reflect the EUV light transmitted through the target having the second thickness;

detecting a second interference pattern by collecting the EUV light re-transmitted through the target having the second thickness after being reflected from the reflector and the EUV light reflected from the target having the second thickness; and detecting the refraction coefficient and the extinction coefficient of the target by comparing the first interference pattern with the second interference pattern.

12. The method of claim 11, wherein the detecting of the refraction coefficient and the extinction coefficient of the target includes:

detecting a phase difference and an intensity difference between the first interference pattern and the second interference pattern by comparing the first interference pattern with the second interference pattern; and detecting the refraction coefficient and the extinction coefficient of the target by using the detected phase difference, the detected intensity difference, and a difference between the first thickness and the second thickness.

13. The method of claim 12, wherein the radiating of the EUV light toward the target having the first thickness and configured to transmit and reflect the EUV light and the reflector configured to reflect the EUV light transmitted through the target having the first thickness includes:

arranging the target having the first thickness on the reflector such that a bottom surface of the target having the first thickness and a top surface of the reflector form a first angle; and radiating the EUV light toward the target having the first thickness and the reflector such that the EUV light reflected from the bottom surface of the target having the first thickness forms a second angle with a normal line of the top surface of the reflector, and the radiating of the EUV light toward the target having the second thickness that is different from the first thickness and the reflector configured to reflect the EUV light transmitted through the target having the second thickness includes:

arranging the target having the second thickness on the reflector such that a bottom surface of the target having the second thickness and the top surface of the reflector form the first angle; and radiating the EUV light toward the target having the second thickness and the reflector such that the EUV light reflected from the bottom surface of the target having the second thickness forms the second angle with the normal line of the top surface of the reflector.

14. The method of claim 12, wherein the refraction coefficient of the target is detected through <Mathematical Formula 1> below, and the extinction coefficient of the target is detected through <Mathematical Formula 2> below:

$$\phi = \left(\frac{2\pi\delta}{\lambda}\right)\alpha' \quad \text{<Mathematical Formula 1>}$$

$$\sqrt{\Delta I} = e^{-\left(\frac{2\pi\beta}{\lambda}\right)\alpha'} \quad \text{<Mathematical Formula 2>}$$

where $\varphi$ is a phase difference between a first interference pattern and a second interference pattern, $\Delta I$ is an intensity difference between a first interference pattern and a second interference pattern, $\lambda$ is a wavelength of EUV light, $1-\delta$ is a refraction coefficient of a target, $\beta$ is an extinction coefficient of a target, $\alpha'$ is $24a/\cos(\theta_1+\theta_2)$, $\Delta\alpha$ is a difference between a first thickness and a second thickness, $\theta_1$ is a first angle, and $\theta_2$ is a second angle.

* * * * *